US008072891B2

(12) United States Patent
Denton et al.

(10) Patent No.: US 8,072,891 B2
(45) Date of Patent: Dec. 6, 2011

(54) METHOD AND APPARATUS FOR PROGRAMMABLE GENERATION OF TRAFFIC STREAMS

(75) Inventors: I. Claude Denton, Beaverton, OR (US); Richard B. Keller, Vancouver, WA (US)

(73) Assignee: Null Networks LLC, Las Vegas, NV (US)

( * ) Notice: Subject to any disclaimer, the term of this patent is extended or adjusted under 35 U.S.C. 154(b) by 475 days.

(21) Appl. No.: 11/532,497

(22) Filed: Sep. 15, 2006

(65) Prior Publication Data
US 2007/0008897 A1  Jan. 11, 2007

Related U.S. Application Data

(63) Continuation of application No. 09/919,728, filed on Jul. 31, 2001, now Pat. No. 7,184,408.

(51) Int. Cl.
*G01R 31/08* (2006.01)
(52) U.S. Cl. ........................................ 370/244; 370/252
(58) Field of Classification Search .................. 370/230, 370/231, 232, 233, 234, 235, 244, 251, 252, 370/253, 503, 519
See application file for complete search history.

(56) References Cited

U.S. PATENT DOCUMENTS

| | | | | |
|---|---|---|---|---|
| 3,819,878 A * | 6/1974 | Pine et al. | ................... | 379/27.01 |
| 3,965,294 A * | 6/1976 | Renz et al. | ................... | 178/69 A |
| 5,163,051 A * | 11/1992 | Biessman et al. | ............. | 714/704 |
| 5,228,042 A * | 7/1993 | Gauthier et al. | ............. | 714/716 |
| 5,255,291 A | 10/1993 | Holden et al. | | |
| 5,257,311 A * | 10/1993 | Naito et al. | ................... | 370/244 |
| 5,313,453 A * | 5/1994 | Uchida et al. | ................. | 370/248 |
| 5,812,554 A * | 9/1998 | Kadambi et al. | .............. | 370/473 |
| 5,931,961 A | 8/1999 | Ranganathan et al. | | |
| 6,002,675 A | 12/1999 | Ben-Michael et al. | | |
| 6,034,948 A * | 3/2000 | Nakamura et al. | ............ | 370/246 |
| 6,061,725 A * | 5/2000 | Schwaller et al. | ............ | 709/224 |
| 6,226,270 B1 * | 5/2001 | Chiku et al. | ................... | 370/248 |

(Continued)

OTHER PUBLICATIONS

Office Action mailed Feb. 1, 2005 for U.S. Appl. No. 09/919,728.

(Continued)

*Primary Examiner* — Ricky Ngo
*Assistant Examiner* — Christine Ng
(74) *Attorney, Agent, or Firm* — Schwabe, Williamson & Wyatt, P.C.

(57) ABSTRACT

Methods and apparatus provide single or multi-port, flexible, cost-effective, built-in self-test capabilities for network communications equipment, such as for example switches, and programmably generate, and subsequently analyze, one or more sequences of test packets, wherein the test packets simulate at least two flows of traffic. Such test packets can have programmable headers, payloads, and duty cycle. A line card embodying the present invention may generate its own traffic pattern, which may be similar or identical, to traffic patterns observed on Internet backbones. These traffic patterns may contain a bimodal distribution of control packets interspersed with data packets wherein the control packets and data packets are relatively short and long respectively. A plurality of test packet generators/receivers can be deployed in a network communications device having a plurality of ports. In such a configuration, test generator/receiver is associated with each of the plurality of ports. Under software control, test packets can be sent from at least any one of the plurality of ports to at least any other one of the plurality of ports. In this way, an in-circuit testing procedure may be implemented without having to disconnect line cards from the switch and connect the switch to expensive external test equipment.

15 Claims, 9 Drawing Sheets

U.S. PATENT DOCUMENTS

| | | | |
|---|---|---|---|
| 6,515,967 B1* | 2/2003 | Wei et al. | 370/244 |
| 6,522,661 B1* | 2/2003 | Min | 370/445 |
| 6,529,480 B1 | 3/2003 | Stewart et al. | |
| 6,574,758 B1* | 6/2003 | Eccles | 714/712 |
| 6,687,231 B1 | 2/2004 | Czerwiec et al. | |
| 6,834,040 B2* | 12/2004 | Tomberlin | 370/241 |
| 6,950,405 B2* | 9/2005 | Van Gerrevink | 370/252 |
| 6,990,294 B2 | 1/2006 | Ikoma et al. | |
| 7,073,198 B1 | 7/2006 | Flowers et al. | |
| 7,184,408 B2* | 2/2007 | Denton et al. | 370/244 |
| 2002/0006115 A1 | 1/2002 | Hedayat et al. | |

OTHER PUBLICATIONS

Office Action mailed Jul. 26, 2005 for U.S. Appl. No. 09/919,728.

Office Action mailed Mar. 8, 2006 for U.S. Appl. No. 09/919,728.

Advisory Action, issued in U.S. Appl. No. 09/919,728, mailed Jun. 1, 2006.

Office Action, issued in U.S. Appl. No. 11/509,948, mailed Sep. 18, 2008.

Office Action, issued in U.S. Appl. No. 11/509,948, mailed Apr. 7, 2009.

Office Action, issued in U.S. Appl. No. 11/509,948, mailed Sep. 10, 2009.

International Search Report, issued in International Patent Application No. PCT/US2002/024348, mailed Dec. 13, 2002.

Lai et al., "Measuring Bandwidth," Proceedings of IEEE Infocom '99, Jul. 15, 1998, 25 pages.

Carter et al., "Measuring Bottleneck Link Speed in Packet-Switched Networks," Performance Evaluation, Mar. 15, 1996, 24 pages, vol. 27-28.

Jain et al., "Pathload: A Measurement Tool for End-to-End Available Bandwidth," In Proceedings of Passive and Active Measurements (PAM) Workshop, Mar. 2002, 12 pages.

Dovrolis et al., "What Do Packet Dispersion Techniques Measure?," Proceedings of IEEE Infocom 2001, Apr. 22, 2001, pp. 905-914.

Office Action, issued in U.S. Appl. No. 11/509,948, mailed Feb. 16, 2010.

Notice of Allowance, issued in U.S. Appl. No. 11/509,948, mailed May 18, 2010.

* cited by examiner

FIG. 6

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | | | |

PAYLOAD BYTES

METHOD AND APPARATUS FOR PROGRAMMABLE GENERATION OF TRAFFIC STREAMS

CROSS-REFERENCE TO RELATED APPLICATION

This application is a continuation of U.S. patent application Ser. No. 09/919,728 filed Jul. 31, 2001, now U.S. Pat. No. 7,184,408 which is incorporated herein by reference in its entirety.

BACKGROUND OF THE INVENTION

1. Field of the Invention

The present invention relates generally to the field of network communications, and more particularly to the testing and verification of protocol modules.

2. Background Information

With advances in integrated circuit, microprocessor, networking and communication technologies, an increasing number of devices, in particular, digital computing devices, are being networked together. Such devices are often first coupled to a local area network, such as an Ethernet based office/home network. In turn, the local area networks are interconnected together through wide area networks, such as Synchronous Optical Networks (SONET), Asynchronous Transfer Mode (ATM) networks, Frame Relay, and the like. Of particular importance is the TCP/IP based global internetwork, the Internet. The rapid growth of the Internet has fueled a convergence of data communication (datacom) and telecommunication (telecom) protocols and requirements. It is increasingly important that data traffic be carried efficiently across local, regional, and wide area networks.

With a great deal of data traffic being generated around the world, there is more and more interest in, and as well as economic incentive to provide, high speed network communications equipment such as, for example, that which is based on SONET. To fulfill these needs there has been an increase in design and production by vendors of high speed network communications equipment. Along with this increased design and production of high speed network communication equipment, there is a correspondingly increased requirement for testing such equipment for functionality and reliability.

Most network communication equipment includes both a transmitter and a receiver. One method of testing such communication equipment in general is to provide data for transmission by the transmitter of the equipment under test, and to provide one or more pathways for that data to be received by the receiver of the equipment. In this way, the data that is transmitted can be compared, after reception, with the data that has been transmitted. Various errors, in either the transmitter, receiver, or pathways, may be detected in this manner.

Unfortunately, high speed transmitters and receivers of network communication equipment, such as those used, for example, to implement SONET systems, are not always easily accessible for the injection of test data.

What is needed are methods and apparatus for providing efficient test pattern generation, insertion, reception, error detection, and reporting, in network communications equipment.

SUMMARY OF THE INVENTION

Briefly, methods and apparatus are provided for programmably generating, transmitting, receiving, and analyzing, one or more sequences of test packets, wherein the test packets simulate at least two flows of traffic. In this way, multichannel test traffic can be generated, received, and analyzed.

In some embodiments of the present invention, the test packets have programmable headers, payloads, and duty cycle.

In some embodiments of the present invention, a plurality of test packet generators and test packet receivers are deployed in a network communications device, such as for example, a switch. In such a configuration, a multi-channel test generator and receiver is associated with each of a plurality of ports in the switch. Under software control of the test generators and receivers, test packets can be sent from at least any one of the plurality of ports to at least any other one of the plurality of ports. In this way, an in-circuit testing procedure may be implemented without having to disconnect line cards from the switch and connect the switch to expensive external test equipment.

BRIEF DESCRIPTION OF THE DRAWINGS

The present invention will be described by way of exemplary embodiments, such as those, illustrated in the accompanying drawings in which like references denote similar elements, and in which:

FIG. 6 is an illustration showing an exemplary synchronization packet format;

DETAILED DESCRIPTION OF THE INVENTION

Figure 1:
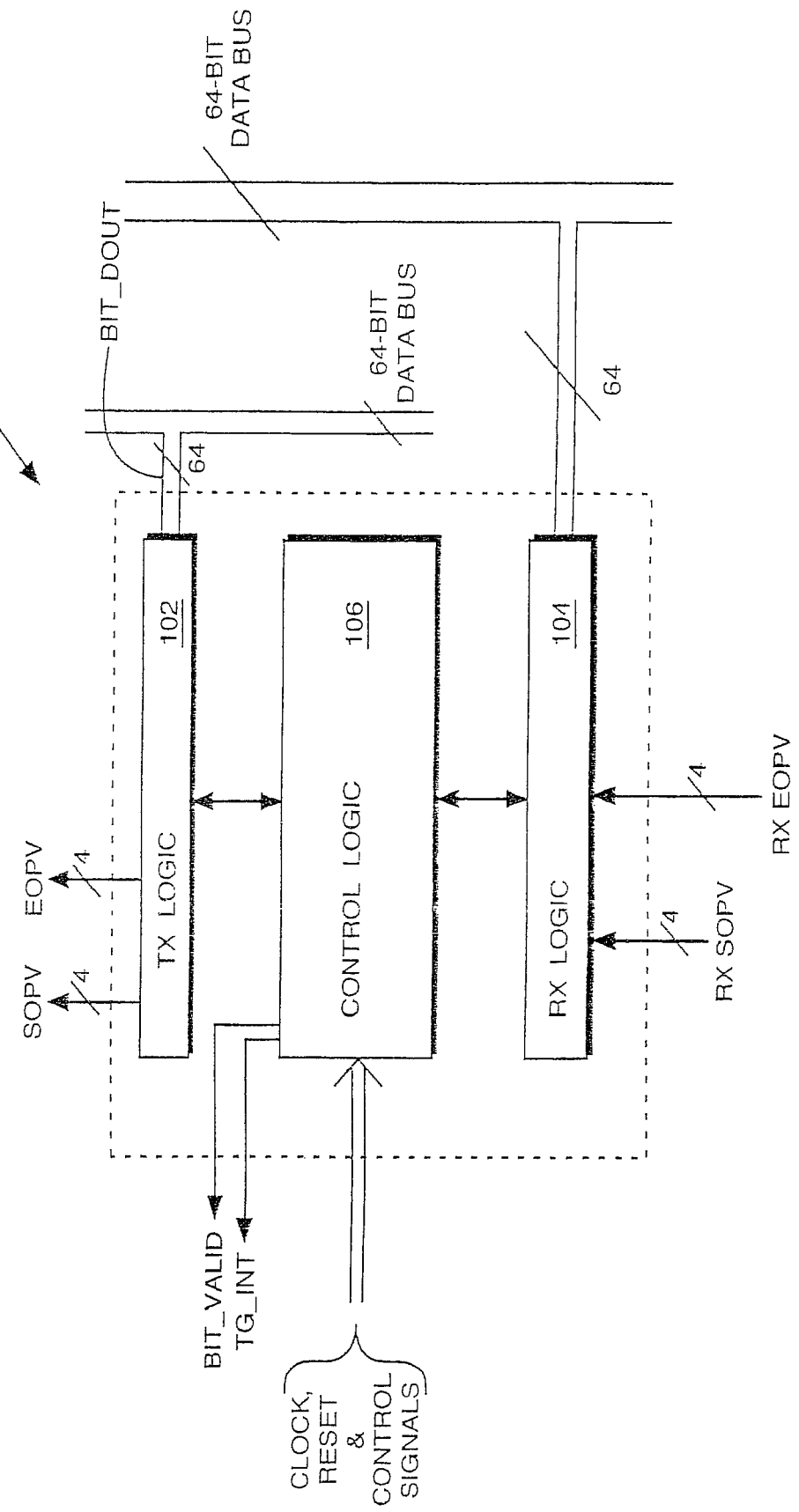
FIG. 1 is a high level block diagram showing a test generator, suitable for inclusion in an integrated circuit, the test generator including a Transmit logic block, and Receive logic block, and a Control logic block, in accordance with the present invention.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Reference herein to "one embodiment", "an embodiment", or similar formulations, means that a particular feature, structure, or characteristic described in connection with the embodiment, is included in at least one embodiment of the present invention. Thus, the appearances of such phrases or formulations herein are not necessarily all referring to the same embodiment. Furthermore, various particular features, structures, or characteristics may be combined in any suitable manner in one or more embodiments.

Terminology

The terms chip, integrated circuit (IC), monolithic device, semiconductor device or component, and microelectronic device or component, are often used interchangeably in this field. The present invention is applicable to all of the above as they are generally understood in the field.

The acronym CRC refers to Cyclical Redundancy Check.

The acronym EOP refers to End of Packet, and EOP vector refers to an End of Packet vector.

The acronym HDLC refers to High-Level Data Link Control, which is a communication protocol used, for example, in a Packet over SONET switching network.

The acronym LFSR refers to linear feedback shift register.

The acronym MAC refers to Media Access Control.

The acronym SOP refers to Start of Packet, and SOP vector refers to a Start of Packet vector.

As new optical transmission standards are introduced at ever increasing rates, for products with ever shrinking development cycles, developers that use physical layer transceivers in their products are facing increasing difficulties in terms of effectively testing these products. These developers are typically vendors of network communications equipment such as, but not limited to, routers and switch systems, and more particularly, the developers have conventionally had a need to purchase physical transceivers and test equipment concurrently in order to test their protocol modules. This situation creates a dilemma in terms of whether the physical transceivers, or the test equipment for the physical transceivers, should be purchased first, and what constraints the purchase of one places on the other. It has not been uncommon for vendor/developers to be forced to wait for several months after the delivery of physical transceivers before adequate testing could begin.

Various embodiments of the present invention provide methods and apparatus by which a line card, or other similar unit of network communications gear, can generate its own traffic pattern that is very similar, or identical, to traffic patterns observed on Internet backbones. Such traffic patterns contain a mixture of short control packets interspersed with long data packets. Typically, conventional layer 2 modules, if they contain built-in testers, can only generate a simple stream of either long packets, or short packets, but not both. However, it would be helpful, and preferable, for testing and evaluation purposes, to be able to provide a bimodal distribution of relatively short control packets and relatively long data packets.

FIG. 1 is a high level block diagram showing an illustrative test generator 100, suitable for inclusion in an integrated circuit, in accordance with the present invention. It should be noted that test generator 100 may also be referred to as a test processor rather than as a test generator because it includes receiver circuitry, in addition to test pattern generation circuitry. However, for convenience, this block will be referred to herein as test generator 100. Test generator 100 includes a Transmit logic block 102, also referred to as a transmitter, a Receive logic block 104, also referred to as a receiver, and a Control logic block 106, also referred to as a controller. Both transmitter 102 and receiver 104 are coupled to controller 106. As will be appreciated by those skilled in the art, transmit logic block 102 and receive logic block 104 are typically coupled by electrically conductive materials. However, buffers, or any type of signal conditioning or processing circuitry, may be included in the communication pathways between controller 106, and transmit logic block 102 and receive logic block 104 respectively. Signals such as clock signals, control signals, and data signals, are typically communicated between controller 106, and transmit logic block 102 and receive logic block 104. Control signals communicated between controller 106 and transmitter 102 may be referred to as transmitter control signals. Similarly, control signals communicated between controller 106 and receiver 104 may be referred to as receiver control signals. Additional details concerning the specific partitioning of functions between controller 106, transmit logic block 102, and receive logic block 104, are described in connection with FIGS. 2 and 3, which show block diagrams of transmitter logic block 102 and receive logic block 104, and the description in connection with Tables I through III, of the various control and programming registers of the control block.

Still referring to FIG. 1, controller 106 includes input terminals for receiving a plurality of clock, reset, and control signals. Transmitter 102 includes an output terminals by which it may be communicatively coupled to other circuits in an integrated circuit, and by which the bit patterns of the test packets generated by test generator 100 may be transmitted. In the illustrative embodiment of FIG. 1, these output terminals are coupled to a 64-bit data bus. Receiver 104 includes input terminals by which it may be communicatively coupled to receive data, such as binary data from a data bus, which in the illustrative embodiment is 64-bits wide. As shown in FIG. 1, receiver 104 also includes input terminals by which it may be communicatively coupled to one or more sources of binary data so as to receive an RX Start of Packet, and a TX Start of Packet.

Illustrative test generator 100 generates, at least, pre-configured pairs of test packets for transmission to a downstream receiver. These test packets can be used to determine the bit error rate and/or to establish the connectivity of a link. The packet headers, which are included in the test packets, are programmable so that a wide variety of packet formats are supported. Link utilizations, inter-packet gap length, and packet lengths are each programmable by means of programming, i.e., setting a value in, a set of writeable registers and counters. In the illustrative embodiment of the test generator, four types of payload data are supported. The four types of payload data include, but are not limited to, 2^16 pseudorandom data patterns, incrementing data patterns, data patterns that are all logic ones, and data patterns that are all logic zeroes. Upon reception of the test data packet, payload data is checked for bit errors, and the number of errored packets, i.e., test packets having errors in one or more bits, is saved in saturating 16-bit registers. The present invention need not be limited to the specifically enumerated data patterns described in this paragraph.

Furthermore, transmitter 102, typically in conjunction with controller 106, of test pattern generator 100, is operable to perform the functions necessary to synchronize a downstream receiver to the generated test pattern data stream. More particularly, transmitter 102 generates a special synchronization message that is sent to that downstream receiver in order to align the data stream expected by the receiver. This synchronization message is sent by test pattern generator 100 under the software control of a host in the illustrated embodiment, but may be generated locally by hardware in test pattern generator 100 in an alternative embodiment. Similarly, hardware associated with, but outside of, test pattern generator 100 may provide the control inputs needed to initiate and complete the transmission of the synchronization message. Those skilled in the art and having the benefit of the present disclosure will appreciate that software control can be achieved by any suitable device that is capable of generating output signals under the direction of a stored program. Typically, such software control is implemented with a commercially available processor such as a microprocessor, or a commercially available microcontroller. Whether referred to as a processor, microcontroller, digital signal processor, computer, or other similar terminology, it will be understood by those skilled in the art and having the benefit of this disclosure, that any control system having a stored program architecture (i.e., a stored program machine) may be used in connection with the above-referenced software control implementation. It is within the scope of the present invention that custom designed, stored program execution hardware may be used to achieve the above-mentioned software control. Additionally, it should be noted that such software control implementation is not limited to any particular instruction set architecture, and may be crafted from a high-level language, assembly language, microcode, or any other suitable representation of the stored program.

In the illustrative embodiment, the host is responsible for providing the signal or signals necessary for enabling transmitter 102, and for sending the synchronization message. Those skilled in the art and having the benefit of this disclosure will recognize that other alternative embodiments may partition the responsibility between hardware-generated and software-generated signals differently within the scope of the present invention.

Figure 2:
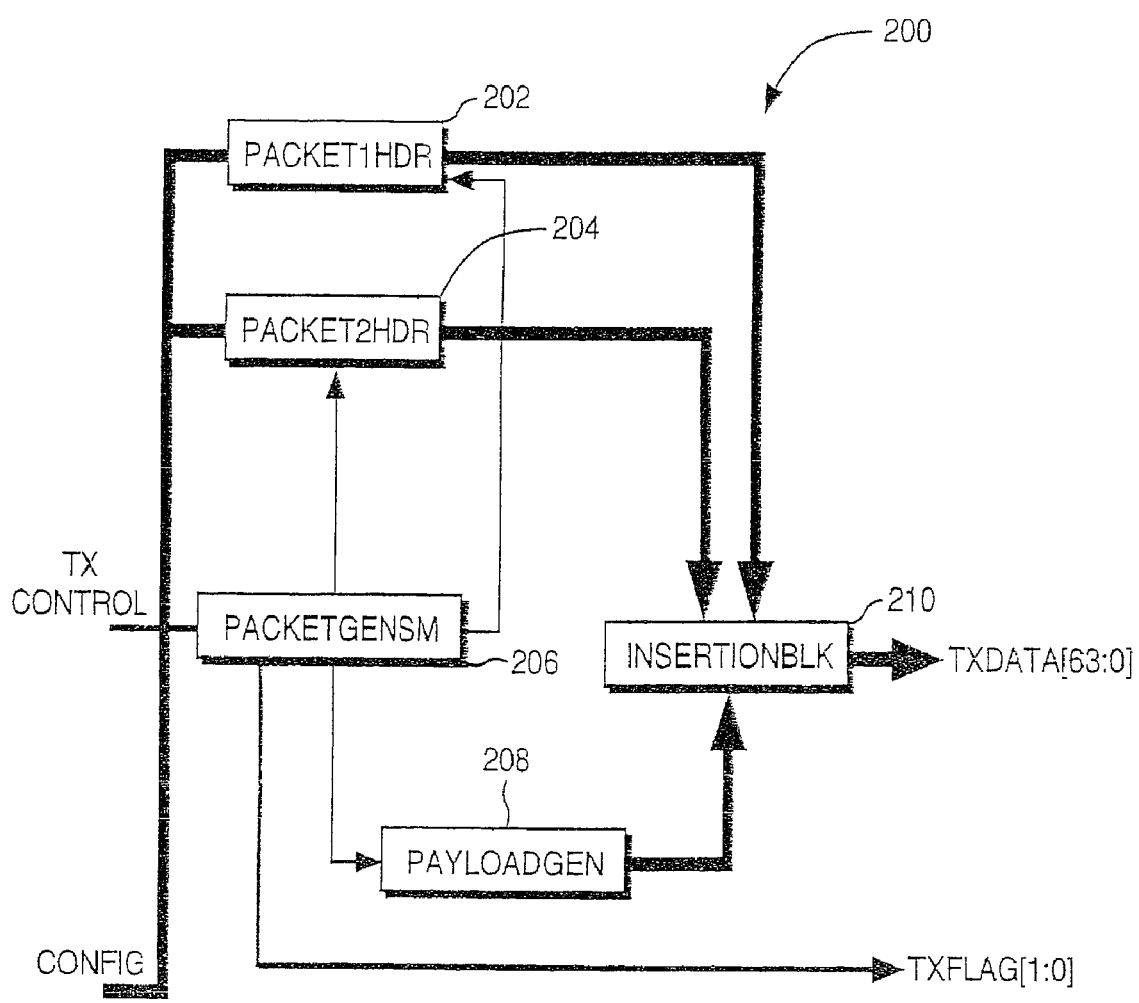
FIG. 2 is a block diagram showing various logical sub-blocks of the Transmit logic block.

Referring to FIG. 2, a block diagram showing additional details of exemplary test generator 100, illustrates the relationship of a packet generator state machine 206 to a first packet header register set 202, a second packet header register set 204, a payload generator 208; and the relationship of first packet header register set 202, second packet header register set 204, and payload generator 208, to an insertion block 210. More particularly, FIG. 2 provides a framework for the understanding of test generator 100, wherein test data packets are constructed, for delivery to an outgoing, parallel, data bus pathway, from one of at least two packet header register sets 202, 204, and payload generator 208.

Figure 3:
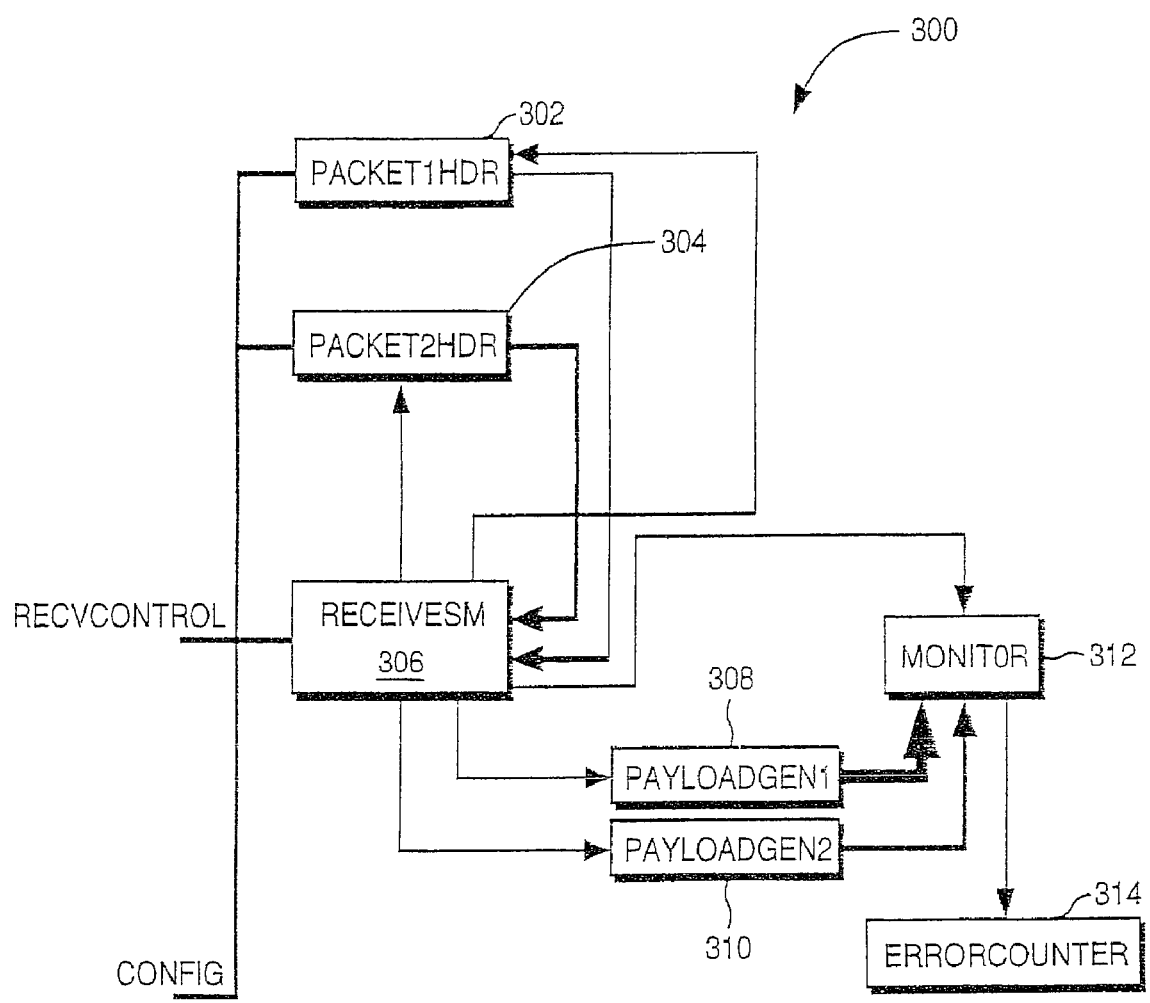
FIG. 3 is a block diagram showing various logical sub-blocks of the Receive logic block.

Referring to FIG. 3, a block diagram showing additional details of exemplary test generator 100, illustrates the relationship of a receive state machine 306 to first packet header register set 302, second packet header register set 304, a first payload generator 308, a second payload generator 310; the relationship of first payload generator 308, and second payload generator 310, to a monitor logic block 312, the relationship of receive state machine 306 to monitor logic block 312, and the relationship of monitor 312 to an error counter 314. More particularly, FIG. 3 provides a framework for the understanding of test generator 100, wherein expected test data packets are generated in the receiver so that they may be compared, by monitor logic block 312 to the test data packets that are actually received. In this way, a "local copy" of the expected data is obtained. Those skilled in the art and having the benefit of this disclosure will recognize that the control registers used by the receive state machine and other logic with the receiver portion of test generator 100 must be programmed appropriately so that the receiver may properly generate the expected data. Programming of these registers is accomplished by software in the illustrative embodiment. Monitor logic block 312, may perform its function in any suitable manner, including but not limited to comparing expected data to received data on a bit-by-bit basis, on a parallel basis, or by an accumulation basis, such as but not limited to, a parity or cyclical redundancy check architecture. Receive state machine 306 provides control signals to first and second packet header register sets 302 and 304, as well as to monitor logic block 312. These control signals provide for the transfer of data and enabling of the appropriate comparison logic to compare both the header and payload data from a selected one of the local receive generators to the incoming test packets. Specific logic circuit implementation is within the common skill of those who practice in the field application specific integrated circuited (ASIC) design. When an errored packet of test data is discovered by monitor logic block 312, a signal is provided to error counter 314 that results in the value in error counter incrementing if the value in error counter 314 is not already saturated. In an alternative embodiment error counter 314 can roll over rather than saturating. In embodiments where one or more error counters roll over rather than saturating, an error flag bit can be maintained to indicate that errors have occurred.

The control interface of the illustrative embodiment comprises a plurality of terminals, by which connection to and from test generator 100 is made. A description of this type is sometimes referred to as a pin description, even though in a typical embodiment, the circuitry of test generator 100 is implemented as a block within an integrated circuit, and therefore the actual physical terminals are not pins as this word is commonly thought of in terms of pins on packaged integrated circuits. Rather, pins, in this context, refer to electrically conductive connection terminals where an electrical connection can be made to a particular signal node. More particularly, various input terminals are provided by which clock signals, reset signals, and control information can be communicated to test generator 100, and various output terminals are provided by which test packets, error counts, and status information can be communicated from test generator 100 to other modules of a larger system. In the illustrative embodiment various busses are coupled to test generator 100 for transmitting test packets, receiving test packets, and reading and writing of control and status information. The implementation of specific circuits, and physical layouts is within the skill of those that practice in the field of ASIC design.

TABLE I

Base Address:

| Offset | Name | D/S | R/W | Default |
|---|---|---|---|---|
| 0, 23 | Packet Configuration (0, 1) | D* | RW | 0 |
| 1, 24 | Packet Size (0, 1) | S | RW | 0x0040 |
| 2-3, 25-26 | Gap Size (low-high, 0, 1) | S | RW | 0 |
| 4-5, 27-28 | Pattern (low-high, 0, 1) | S | RW | 0 |
| 6-15, 29-38 | Packet Header 0-9 (0, 1) | S | RW | 0 |
| 16, 39 | Status/Counter Control (0, 1) | D | RW | 0 |
| 17-18, 40-41 | Transmit Packet Count (low-high, 0, 1) | D | R | 0 |
| 19-20, 42-43 | Receive Packet Count (low-high, 0, 1) | D | R | 0 |
| 21-22, 44-45 | Payload Error Count (low-high, 0, 1) | D | R | 0 |

Register Map and Descriptions

The register map of the illustrative embodiment comprises the following registers, by which programming of test generator 100 is achieved. All the registers described in connection with Table I, above, are 16 bits wide. Inspecting Table I it can be seen that there are really two sets of registers that are defined, and that each set consists of twenty-three registers. However, to enable the transmitter and receiver portions of test generator 100 to operate fully independently, there can be one set of registers for each of the two transmit channels and each of the two receive channels, thereby requiring four sets of registers. The registers may be assigned an arbitrary base address. Each of the registers is then offset from that base address by the amount indicated in Table I. It will be understood from Table I and the information in this paragraph that the offset amounts are expressed as addresses on 16-bit boundaries. If the offset amounts were expressed in conventional byte addressing, then the offsets shown in Table I would be doubled. Each of the two sets of registers indicated in Table I is used to control and define the creation of a test data packet that includes a header, a payload, and an inter-packet gap; and each of the two sets of registers further includes counters for recording information regarding the number of transmitted packets, received packets, and errored packets.

TABLE II

| Bit Location | Field Name | D/S* | R/W | Default |
|---|---|---|---|---|
| 0 | Transmit Enable | D | RW | 0 |
| 1 | Receive Enable | D | RW | 0 |
| 3:2 | Packet Payload | S | RW | 0x1 |
| 5:4 | LFSR Size | S | RW | 0x2 |
| 10:6 | HeaderSize | S | RW | 0 |
| 15:11 | Reserved | S | R | 0 |

The two Packet Configuration registers are readable and writeable (R/W), default to a value of zero (i.e., a logic low state) when reset, and are considered to be dynamic, which as used herein, means that the value of the bits in the registers may change without those bits being altered by program control. The mapping of the functionality of the bits of the Packet Configuration registers is shown in Table II above, and explained in the following text.

Bit 0 is referred to as the Transmit Enable bit, and when set, enables transmission of test packets. In the illustrative embodiment, a typical startup procedure includes enabling the receiver on one end of the link, allowing the link to gain synchronization, and then enabling the transmitter at the other end of the loop.

Bit 1 is referred to as the Receive Enable bit, and when set, enables receive checking of test packets. A typical startup procedure includes enabling the receiver on one end of the link, allowing the link to gain synchronization, and subsequently enabling a transmitter at the other end of the link. The receiver is intended to synchronize to the first packet in the stream.

Bits 3:2 are referred to as the Packet Payload field, and are set to select the type of payload data that is inserted into the packets. More particularly, setting bits 3:2 to a 00 (the default state of these bits) specifies alternating between a programmed 32 bit value and its complement; setting to 01 specifies an LFSR sequence; setting to 10 specifies a particular 32-bit programmed value; and setting to 11 specifies a 16-bit count sequence.

Bits 5:4 are referred to as the LFSR Size bits, and are set to select the LFSR for the LFSR sequence payload. More particularly, setting bits 5:4 to a 00 specifies a 16-bit LFSR; setting bits 5:4 to a 01 specifies a 20-bit LFSR; setting bits 5:4 to a 10 specifies a 24-bit LFSR; and setting bits 5:4 to a 11 specifies a 32-bit LFSR.

Bits 10:6 are referred to as the Packet Header Size bits, and are set to define the length, in bytes, of the packet. In this illustrative embodiment, up to 20 bytes can be drawn from the header configuration registers. The remaining header bytes, if any, can be filled with all zeros.

The two Packet Size registers are R/W, default to a value of 0x0040h when reset, and are considered to be static, which as used herein, means that the value of the bits in the registers may not change without those bits being altered by program control. The Packet Size registers for the first and second packets, are each 16-bits wide, and specify the total size of the generated packets, in bytes. In the illustrated embodiment, the programmed value of 16 or larger, and must be a multiple of 8. All values lower than 16 will be treated as zero, causing no packets to be generated.

The four Gap Size registers are R/W, default to a value of 0 when reset, and are considered to be static. The Gap Size registers for the first and second packets are each implemented as two sixteen bit registers so as to provide a 32-bit wide field. Each of these 32-bit fields specifies the size of the idle gap between test packets. A gap as configured by setting (or programming, or writing) the Gap Size register associated with the first packet will follow transmission the first packet. Similarly, a gap as configured by setting (or programming, or writing) the Gap Size register associated with the second packet will follow transmission of the second packet. The programmed value must be a multiple of 8, and 0 is a legal gap value.

The four Pattern registers are R/W, default to a value of 0 when reset, and are considered to be static. The Pattern registers for the first and second packets are each implemented as two sixteen bit registers so as to provide a 32-bit wide field. Each of these 32-bit fields specifies the value used for payload settings 0 and 2. In setting 0, words of the packet payload alternate between this value and its complement. In setting 2, packet payloads are filled with this value.

The twenty Packet Header registers are R/W, default to a value of 0 when reset, and are considered to be static. The Packet Header for each of the first packet and the second packet are defined, at least in part, by their respective 20-byte fields. Each of these 20-byte fields provides storage for containing the header bytes that can be used as transmit packet headers. As discussed elsewhere herein, the actual length of the packet header is determined by the programmable packet header size setting. The first packet header byte to be transmitted is the byte in bit positions 15:8 of the highest addressed 16-bit register of the Packet Header field for each of the first and second packets.

The two Status/Counter Control registers are R/W, default to a value of 0 when reset, and are considered to be dynamic. Various bits of these registers are used in the control of forcing transmitter and receiver resynchronization operations, to indicate changes to counter values, to enable various interrupt conditions, and to provide similar control and status functions.

The four Transmit Packet Counter registers are readable, default to a value of 0 when reset, and are considered to be dynamic. The Transmit Packet Counter registers for the first packet and the second packet are each implemented as two 16-bit registers so as to provide a 32-bit wide field. Each of these 32-bit fields specifies the value used for maintaining a count of transmit test packets of a specified type. The value that can be read back from each of the Transmit Packet Counters is updated upon a latch and clear operation. Absent a latch and clear operation, the value in each of the counters remains the same. The latch and clear operations referred to in this paragraph are accomplished atomically, such that no event can go uncounted. Each of the Transmit Packet Counter registers will saturate rather than overflow if its range is exceeded.

The four Receive Packet Counter registers are readable, default to a value of 0 when reset, and are considered to be dynamic. The Receive Packet Counter registers for the first packet and the second packet are each implemented as two 16-bit registers so as to provide a 32-bit wide field. Each of these 32-bit fields specifies the value used for maintaining a count of received test packets of a specified type. The value that can be read back from each of the Receive Packet Counters is updated upon a latch and clear operation. Absent a latch and clear operation, the value in each of the counters remains the same. The latch and clear operations referred to in this paragraph are accomplished atomically, such that no event can go uncounted. Each of the Receive Packet Counter registers will saturate rather than overflow if its range is exceeded.

The four Payload Error Counter registers are readable, default to a value of 0 when reset, and are considered to be dynamic. The Payload Error Counter registers for the first packet and the second packet are each implemented as two 16-bit registers so as to provide a 32-bit wide field. Each of these 32-bit fields maintains a count of bit errors detected by the receive test module in the payloads of packets of the specified type. Errors in headers will lead to packets being missed by the detection logic, which may lead to undetected misalignment. In this situation the payload error count will climb very rapidly. The value that can be read back from each of the Payload Error Counters is updated on latch and clear, and is stable otherwise. The latch and clear operations are accomplished atomically, such that no event can go uncounted. Each of the Payload Error Counter registers will saturate rather than overflow if its range is exceeded.

An illustrative test generator block 100 in accordance with the present invention, as shown in FIG. 1, allows a user to generate and analyze test packets within a single chip. In a typical application, illustrative test generator block 100 is used for generating and analyzing test patterns. The illustrative embodiment is operable to generate and analyze two independent data streams, and more particularly is operable to simulate typical data packet flows that include short control packets followed by long data packets.

Figure 4:
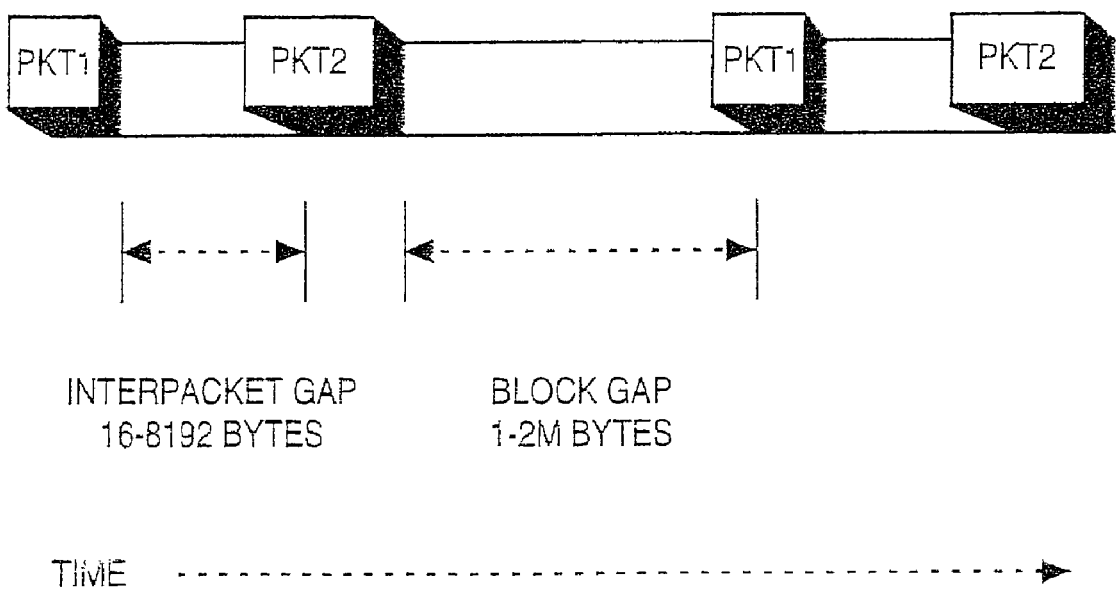
FIG. 4 is an illustration showing an exemplary packet and gap format produced by the test generator of the present invention.

FIG. 4 illustrates a bimodal distribution of short test packets, representative of control packets, and long test packets, representative of data packets. The block labeled PKT1 contains fewer bits than PKT2 and therefore consumes a smaller amount of time in its transmission, as indicated in the figure. The figure further illustrates an inter-packet gap between PKT1 and PKT2, and a block gap between PKT2 and PKT1.

Illustrative test generator block 100 is divided into three sections, egress (i.e., transmitter), ingress (i.e., receiver), and control. Egress can also be used to describe an outgoing data path from the system to the network. Ingress can also be used to describe an incoming data path from the network to the system. The egress block generates test packets that the ingress block analyzes by checking the headers and payloads thereof. The control block, in the illustrative embodiment, includes circuitry for implementing a micro-controller interface and monitoring registers, as well as configuration control circuitry. Each egress block and ingress block is further divided into a pair of independent channels for generating and analyzing a pair of packet flows. Those skilled in the art and having the benefit of this disclosure will recognize that the number of channels may be larger although that would require additional hardware and software support.

The illustrative egress block is operable to generate a frame of packets containing two unique packets and a gap interval after each packet. Each packet contains a 20 byte programmable header, a payload and a gap interval. Each packet in the illustrative embodiment is generated on 8 byte boundaries and gaps in the illustrative embodiment have a length that is an integer multiple of 8 bytes.

The analyzer function of the ingress block works by monitoring all packets that enter the receiver. All the incoming packets are filtered and only the packets with appropriately matching headers are passed to the payload comparison logic. Each receiver is programmed, or configured, to check the expected payload and header that were generated in the transmitter. All the packets with correctly matching headers are counted, and a value representative of the number of passed packets (i.e., test packets without errors) is maintained in the Receive Packet register. Packets with payload mismatches are counted in the Errored Packets register.

In the illustrative embodiment, the ingress and egress blocks contain logically identical packet generators. The packet generator of the ingress block creates packets that are compared against the packets generated by the egress module. This requires that both the ingress and egress modules be initialized to the same state before performing a comparison that can yield valid results.

The receiver in the ingress module synchronizes to the transmit stream by automatically initializing itself to the first packet it receives from the transmitter. The receiver synchronizes automatically by continuously loading the incoming data stream into its packet generating logic circuits to bring itself into a known state. Once in a known state, the receiver will be synchronized to the transmitter because both transmitter and receiver contain identical logic circuits, start with an identical initial state, and the next state is only determined by the initial state and the function of the logic circuits. An exemplary embodiment of this process is illustrated in FIG. 5.

Figure 5:
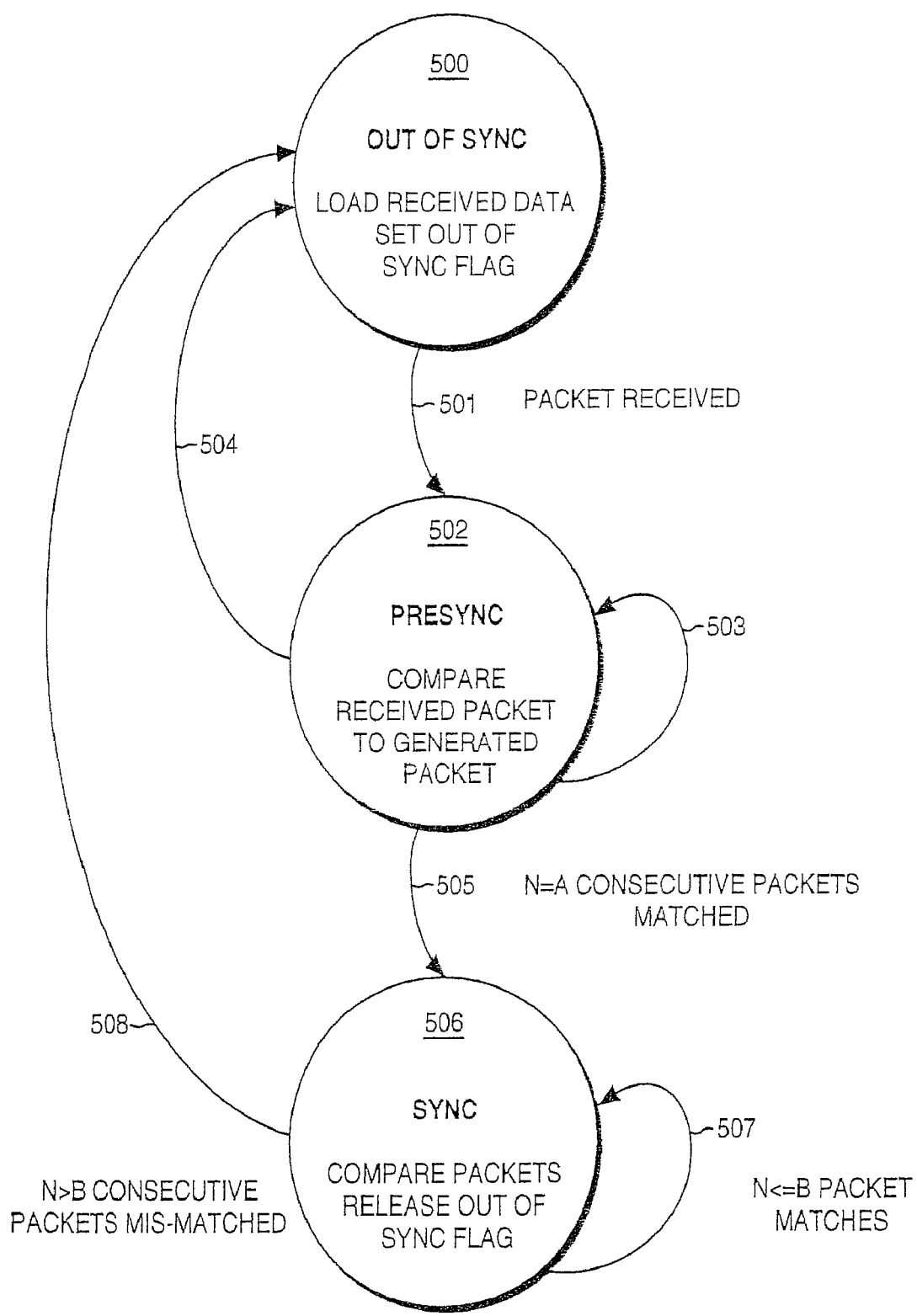
FIG. 5 is a state diagram illustrating an exemplary process by which a receiver synchronizes to a transmitter in various embodiments of the present invention.

Referring to FIG. 5, a state diagram is shown in which a synchronization process illustrated. More particularly, the receiver is initially in an out-of-synchronization (OUT-OF-SYNC) state 500 and an OUT-OF-SYNC flag is set. The receiver continuously loads incoming data into its logic circuits until an EOP flag is received. After receiving the EOP flag 501, the exemplary process implemented in the receiver transitions to a PRESYNC state 502. In PRESYNC state 502, the receiver compares each incoming packet to its own internally generated packets. If at least "a" consecutive packets match, where "a" can be preprogrammed to be a predetermined integer number representing one or more packets, then a state transition takes place 505 bringing the receiver to an in-synchronization (SYNC) state 506. Until this condition is met, the receiver continues in PRESYNC state 502. In SYNC state 506, the OUT-OF-SYNC flag is cleared by the receiver. It will be recognized that the flag can be set to indicate an out-of-sync condition or an in-sync condition since the polarity of the flag can be interpreted without ambiguity. Alternatively, separate out-of-sync and in-sync flags may be maintained, and set and cleared consistent with reflecting the state of the system, as will be understood by those skilled in the art of digital design. The receiver repeatedly compares its internally generated packet data against the received data. If at least "b" consecutive packets match, where "b" represents a predetermined integer number of packets, then the receiver continues to transition back 507 to the same state, i.e., SYNC state 506. If more than "b" consecutive packets are errored, the receiver transitions 508 to OUT-OF-SYNC state 500. This method allows the transmitters and receivers to automatically move into synchronization even if several packets of a data stream are dropped. It should be noted that the numbers "a" and "b" may be the same or different.

In one aspect of an illustrative embodiment, 16 byte packets can be transmitted back to back with no inter-packet delays on a 64-bit bus, and so inter-packet gap characters are ignored allowing the ingress block to operate at a peak rate. In this scenario, the peak rate for 16-byte packets with no gap, is 78 million packets per second. This is based on 8 bytes per clock cycle, 1 packet taking 2 clock cycles, a clock rate of 156 MHz (i.e., 6.4 nanoseconds per clock cycle), and therefore 1 packet every 12.8 nanoseconds gives about 78 million packets per second. The ingress block ignores all gaps and can handle cases of packet streams with no inter-packet gaps. Zero or more gaps may be inserted, or removed, by the network since the ingress block, which is where the received data stream is analyzed, does not require that there be inter-packet gaps.

Various types of payloads can be generated by test generator 100 of the illustrative embodiment. More particularly, in the illustrated embodiment, the facility to generate four types of payloads, quasi-random static sequence (QRSS); byte constant; 32-bit toggling; and 16-bit incrementing; is implemented.

FIG. 6 displays the format of an egress, i.e., a transmitted packet on a 64-bit wide data bus in the illustrative embodiment. The header bytes are placed in byte lane 7, 6, 5, ... 0 respectively, followed by the payload byte sequences. The transmission order is most significant byte first, with the most significant bit of each byte transmitted first. Counting sequences (16-bit) are inserted sequentially into the byte lanes starting with the most significant byte first. An example of the 16-bit counting sequence is: 0000, 0001, 0002, 0003, 0004, 0005, 0006, 0007.

The QRSS patterns used in the illustrative embodiment are programmable to four lengths. Those skilled in the art and having the benefit of the present disclosure will recognize that various quasi random patterns can be used.

The byte constant pattern is simply a pre-determined fixed pattern, for example, a single byte, or group of bytes, that are inserted into the payload of a packet. Such a pattern is then repeatedly inserted into the packet until the packet is filled. The byte constant pattern can be implemented, consistent with the present invention, as one or more patterns fixed in hardware circuitry, or may be programmable.

The 32-bit toggling payload is a repeating 32-bit pattern that toggles every 64 bits. The purpose of the 32-bit toggling payload is to generate more complex patterns than is achieved by the constant 32-bit word pattern. For example, the 32-bit toggling payload can be used to diagnose switching noise problems by generating payloads and headers with toggling bytes or words.

The 16-bit incrementing pattern is produced by a counter that counts from zero to 0xFFFFh and then returns to zero, thereby repeating the same pattern.

Some examples of implementation-related best practices for successful operation of the particular implementation described herein include choosing payload sizes for test packets. These are not limitations with respect to the present invention, but rather best operating practices for the exemplary implementation of the present invention described herein.

Another example of implementation-related best practices for successful operation of the particular implementation described herein includes choosing the packet headers for multiple flows that are unique from each other. In other words, the test packet generators (for transmitter and receiver) must be programmed so that the header matching logic can determine a unique match between each transmitted packet and each expected packet. For instance, if the generators that provide expected data to the analyzer portion of the receiver are each programmed so as to expect the same header and header length, but further programmed to expect different payload types, then, together, the receivers will be analyzing all packets. As a result, the analyzers together will find errors in all packets because, from the point of view of each receiver, all received packets came from have expected headers, but at least one analyzer will interpret the payload data as being in error. This highlights the importance of having unique headers for each of the packet streams. It should be noted in the context that unique headers that it is preferable that one header not be a subset of the other header.

Another operational recommendation for the specific illustrative embodiment provided herein, i.e., useful for this particular embodiment but not necessarily required by alternative implementations of the present invention, is that only one test packet generator should be used when a zero byte header is selected.

In some embodiments of the present invention, an out-of-sync condition can be created if the network over which test packets travel acts to change the size of the test packets. For such implementations of the present invention an operational recommendation is that the network not shorten, or lengthen, packets.

Alternative embodiments of the present invention may include support in the analyzer logic for checking packet lengths.

Figure 7:
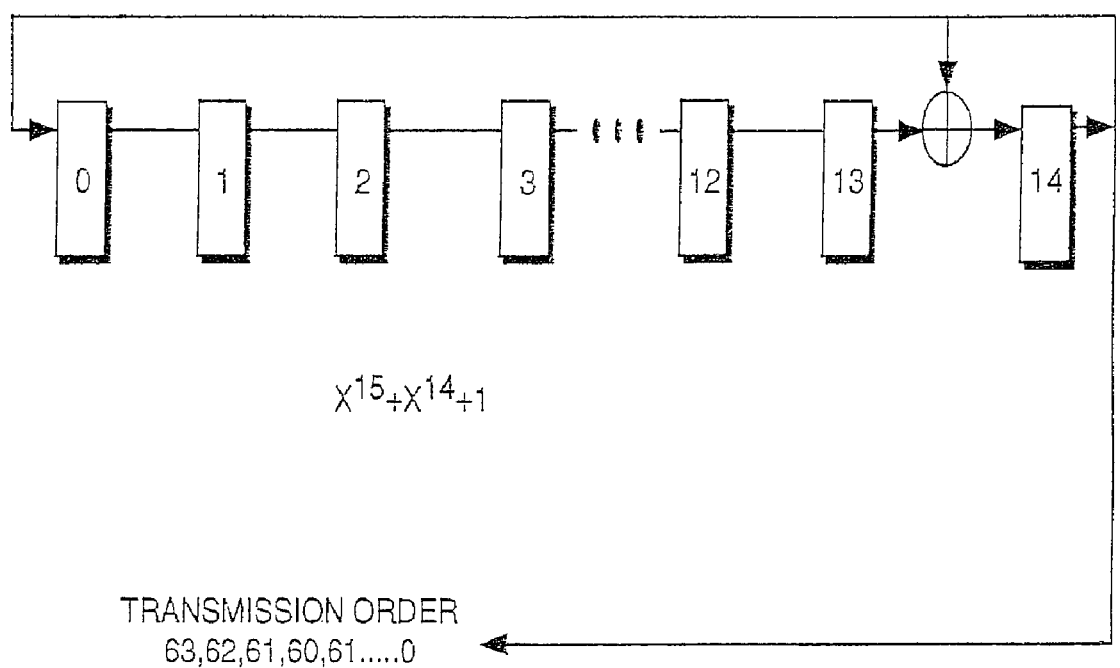
FIG. 7 is a block diagram of a quasi-random static sequence generator.

FIG. 7 shows an example of a polynomial shift register configuration for providing the $2^{15}$-1 sequence transmitted by the QRSS pattern generators. The most significant bit of the LFSR is the first bit transmitted, and this bit is placed in bit 63 of a 64-bit word that is formatted as 63:0.

Figure 8:
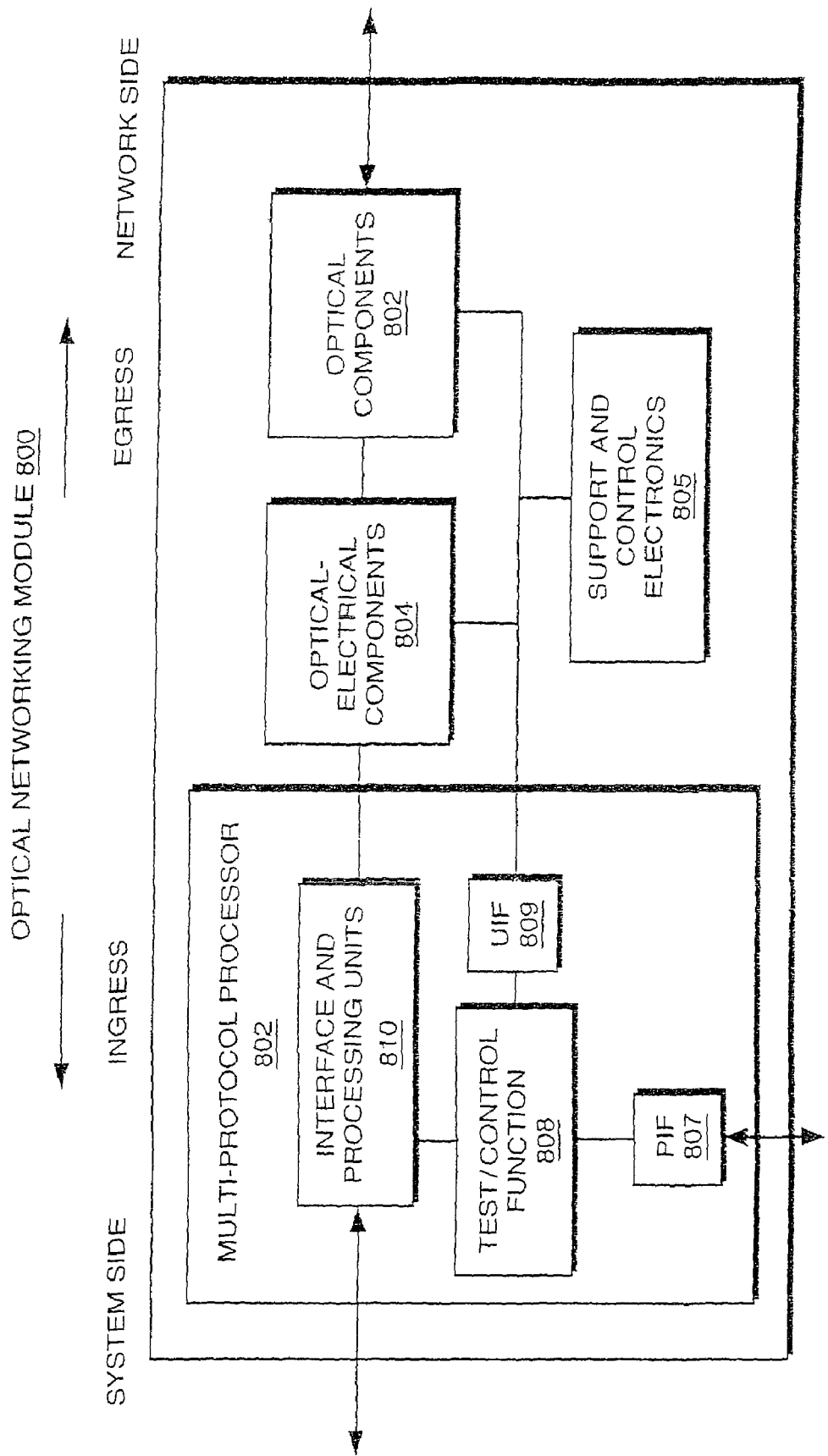
FIG. 8 is a block diagram of an optical networking that includes a test packet generator and receiver in accordance with the present invention.
Figure 9:
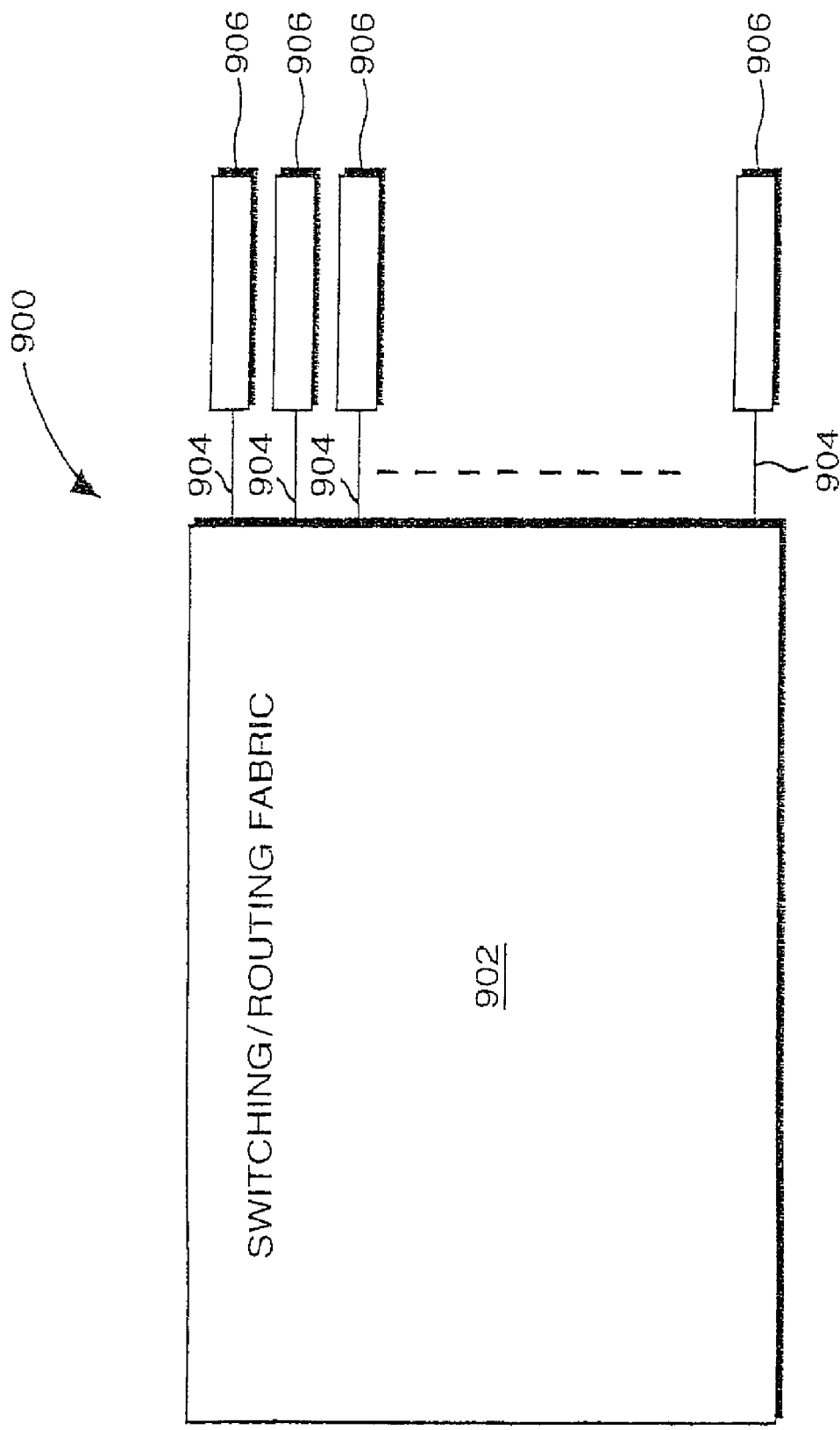
FIG. 9 is a block diagram illustrating a switch having a plurality of the optical modules of FIG. 8.

FIGS. 8 and 9 illustrate an optical networking module including the test generator (which includes receiving circuitry) as described above, and a network communication device, or system, in which the optical module is incorporated, respectively.

Referring to FIG. 8, an integrated optical networking module 800 incorporated includes optical components 802, optical-electrical components 804, support control electronics 805, and multi-protocol processor 802, coupled to each other as shown. Multi-protocol processor 802 includes in particular, a number of interfaces and processing units, collectively referenced as reference number 810, test and control function unit 808, processor interface 807 and utility interface 809 coupled to each other and components 802-804 as shown. Test and control function unit 808 includes test packet generation and reception logic such as that illustrated and described above in connection with test generator 100.

Referring to FIG. 9, block diagram of a network communication system 900 is shown which includes a switching/routing fabric 902, having a plurality of ports 904, and a corresponding plurality of line cards 906, each line card 906 including an optical networking module 800 as described in connection with FIG. 8. In this way testing can be accomplished without having to remove line cards and connecting the network communication system to expensive external test equipment. Further in this manner, testing can be accomplished at full-speed, because the network equipment itself is generating, transmitting and receiving the test data. This arrangement may sometimes be referred to as in-circuit testing.

CONCLUSION

Thus, it can be seen from the above descriptions and accompanying figures that methods and apparatus for built-in self testing of network communications equipment, such as for example, switches, as well as methods and apparatus for the programmable generation of traffic streams have been disclosed. More particularly, an architecture for flexible and cost-effective single and multi-port testing of network communications equipment has been described and illustrated. Additionally, an architecture for embedded programmable generation, insertion, reception, and verification, of test data streams has been described and illustrated herein.

Various embodiments of the present invention include network communications equipment operable to perform single and multi-port self-testing and thereby substantially eliminate the need for expensive external test equipment, and substantially reduce the amount of time required to perform such testing.

Various embodiments of the present invention include functions such as generating programmable payloads, where the headers are programmable by the user and, up to 20 bytes long, the payload length is programmable, the frame length is programmable, and where transmitted packets are matched with received packets. Furthermore, various embodiments of the present invention can generate up two packets per frame with programmable inter-packet delays. In some embodiments, the inter-packet gap lengths are programmable in increments of eight bytes. In some embodiments, the transmitter of the test generator provides a SYNC Packet for synchronizing the downstream receiver.

While the present invention has been described in terms of the above-described embodiments, those skilled in the art will recognize that the invention is not limited to the embodiments described. The present invention can be practiced with modification and alteration within the spirit and scope of the appended claims. Thus, the description herein is to be regarded as illustrative rather than restrictive with respect to the present invention.

What is claimed is:

1. A method for testing a network communication device having a plurality of ports, comprising:
generating, by a receiver, a plurality of test packets expected to be received by the network communication device, wherein the receiver is included in the network communication device and is associated with one of the ports of the network communication device;
receiving, by the receiver, a plurality of test packets generated and transmitted by a transmitter;
wherein the receiver and the transmitter each comprises first and second packet register sets on respective first and second parallel channels, the transmitter including a first payload generator coupled to the first and second packet register sets of the transmitter and the receiver including first and second payload generators coupled to the first and the second packet register sets of the receiver, the first and the second payload generators included on respective third and fourth parallel channels in the receiver;
comparing, by the receiver, the plurality of test packets expected to be received with the plurality of test packets received from the transmitter, wherein the comparing includes comparing a plurality of test packets representative of control packets expected to be received with a plurality of test packets representative of control packets received, wherein each of the plurality of test packets representative of control packets is interspersed among a plurality of test packets representative of data packets in a pattern configured to simulate internet traffic; and
reporting, by the receiver, occurrence of one or more errors based at least in part on a result of said comparing of the plurality of test packets;
wherein the transmitter and the receiver are synchronized with each other.

2. The method of claim 1, wherein the method further comprises:
receiving, by the receiver, a plurality of synchronization packets from the transmitter until an end of packet flag is received,
generating, by the receiver, a plurality of expected synchronization packets;
comparing, by the receiver, the plurality of synchronization packets received with the plurality of expected synchronization packets generated; and
indicating, by the receiver, that the receiver is synchronized with the transmitter based at least in part on a result of said comparing of the synchronization packets.

3. The method of claim 1, wherein each of the test packets in the plurality of test packets received or expected to be received comprises a programmable header, a payload and a gap interval.

4. The method of claim 3, wherein said comparing the plurality of test packets expected to be received with the plurality of test packets received from the transmitter comprises:
filtering, by the receiver, the plurality of test packets received and the plurality of test packets expected to be received based at least in part on the headers; and
comparing, by the receiver, the payloads of the plurality of test packets received with the payloads of the plurality of test packets expected to be received based at least in part on a result of said filtering.

5. An article of manufacture comprising:
a non-transitory tangible computer-readable storage medium; and
a plurality of instructions stored in the tangible computer-readable storage medium, wherein the instructions, in response to execution by a test packet generator associated with a port of a network communication equipment, cause a receiver of the test packet generator to perform operations comprising:
generating a plurality of test packets expected to be received by the receiver, including generating a plurality of test packets representative of control packets and generating a plurality of test packets representative of data packets, wherein each of the plurality of test packets representative of control packets is interspersed among the plurality of test packets representative of data packets in a pattern configured to simulate internet traffic;
receiving a plurality of test packets generated and transmitted by a transmitter of another test packet generator associated with another port of the network communication equipment;
comparing the plurality of test packets expected to be received with the plurality of test packets received; and
reporting occurrence of one or more errors based at least in part on a result of said comparing of the test packets;
wherein the transmitter of the another test packet generator and the receiver are synchronized with each other and wherein the receiver and the transmitter each comprises first and second packet register sets on respective first and second parallel channels, the transmitter including a first payload generator coupled to the first and second packet register sets of the transmitter and the receiver including first and second payload generators coupled to the first and the second packet register sets of the receiver, each of the first and the second payload generators included on respective third and fourth parallel channels of the receiver.

6. The article of manufacture of claim 5, wherein the operations further comprise:
synchronizing with the transmitter of the another test generator associated with the other port of the network communication equipment;
receiving a plurality of synchronization packets from the transmitter of the another test packet generator associated with the another port of the network communication equipment until an end of packet flag is received;
generating a plurality of expected synchronization packets;
comparing the plurality of synchronization packets received with the plurality of expected synchronization packets generated; and
indicating that the receiver is synchronized with the transmitter of the another test packet generator associated with the another port of the network communication equipment based at least in part on a result of said comparing of the synchronization packets.

7. The article of manufacture of claim 5, wherein each of the test packets in the plurality of test packets received or expected to be received comprises a programmable header, a payload and a gap interval.

8. The article of manufacture of claim 7, wherein said comparing the plurality of test packets expected to be received with the plurality of test packets received from the transmitter of the another test packet generator associated with the another port of the network communication equipment comprises:
filtering the plurality of test packets received and the plurality of test packets expected to be received based at least in part on the headers; and
comparing the payloads of the plurality of test packets received with the payloads of the plurality of test packets expected to be received based at least in part on a result of said filtering.

9. A network communication device, comprising:
a plurality of test packet generators located at corresponding ports in the network communication device and configured to test the network communication device, wherein a test packet generator of the plurality of test packet generators includes a receiver configured to:
receive a plurality of test packets transmitted from a transmitter of another test packet generator;
generate a plurality of test packets expected to be received;
compare the plurality of test packets received with the plurality of test packets expected to be received, wherein the comparing includes comparing a plurality of test packets representative of control packets expected to be received with a plurality of test packets representative of control packets received, wherein each of the plurality of test packets representative of control packets is interspersed among a plurality of test packets representative of data packets in a pattern configured to simulate internet traffic, wherein the receiver and the transmitter each comprises first and second packet register sets on respective first and second parallel channels, the transmitter including a first payload generator coupled to the first and second packet register sets of the transmitter and the receiver including first and second payload generators coupled to the first and the second packet register sets of the receiver, the first and the second payload generators on respective third and fourth parallel channels of the receiver;
and
report occurrence of one or more errors based at least in part on a result of said comparison of the plurality of test packets received with the plurality of test packets expected to be received;
wherein the transmitter of the another test packet generator and the receiver of the test packet generator are synchronized with each other.

10. The network communication device of claim 9, wherein the receiver of the test packet generator is configured to:
receive a plurality of synchronization packets from the transmitter of the another test packet generator until an end of packet flag is received;
generate a plurality of expected synchronization packets;
compare the synchronization packets received with the expected synchronization packets generated; and
indicate that the receiver of the test packet generator is synchronized with the transmitter of the another test packet generator based at least in part on said comparison of the synchronization packets received with the expected synchronization packets generated.

11. The network communication device of claim 10, wherein the receiver of the test packet generator is configured to generate test packets, and wherein each test packet contains a programmable header, a payload and a gap interval.

12. The network communication device of claim 11, wherein the receiver of the test packet generator is configured to compare the plurality of test packets received with the plurality of test packets expected to be received by:
filtering the plurality of test packets received and the plurality of test packets expected to be received based on the headers; and
comparing the payloads of the test packets received with the payloads of the test packets expected to be received based at least in part on a result of said filtering.

13. The network communication device of claim 9, wherein the test packet generator further comprises:
a controller coupled with the receiver of the test packet generator, and configured to receive control signals to control the receiver of the test packet generator.

14. A network communications system, comprising:
a switch including a plurality of ports;
a plurality of line cards, each line card of the plurality coupled to at least one of the ports, each line card including an optical networking module, each optical networking module including first and second test packet generators, wherein the first test packet generator includes a receiver configured to:
receive a plurality of test packets transmitted from a transmitter of the second test packet generator;
generate a plurality of test packets expected to be received;
compare the plurality of test packets received with the plurality of test packets expected to be received, wherein the comparing includes comparing a plurality of test packets representative of control packets expected to be received with a plurality of test packets representative of control packets received, wherein each of the plurality of test packets representative of control packets is interspersed among a plurality of test packets representative of data packets in a pattern configured to simulate internet traffic, wherein the receiver and the transmitter each comprises first and second packet register sets on respective first and second parallel channels, the transmitter including a first payload generator coupled to the first and second packet register sets of the transmitter and the receiver including first and second payload generators coupled to the first and the second packet register sets of the receiver, the first and the second payload generators included on respective third and fourth parallel channels of the receiver.

15. The network communications system of claim 14 wherein first and second headers of respective first and second test packets of the plurality of test packets received contain different data.

* * * * *

UNITED STATES PATENT AND TRADEMARK OFFICE
CERTIFICATE OF CORRECTION

| | | |
|---|---|---|
| PATENT NO. | : 8,072,891 B2 | Page 1 of 1 |
| APPLICATION NO. | : 11/532497 | |
| DATED | : December 6, 2011 | |
| INVENTOR(S) | : Denton et al. | |

It is certified that error appears in the above-identified patent and that said Letters Patent is hereby corrected as shown below:

In The Specifications:

In Column 1, Line 27, delete "(SONET)," and insert -- (SONETs), --, therefor.

In Column 7, in Table II, under "Field Name", Line 5, delete "HeaderSize" and insert -- Header Size --, therefor.

In Column 13, Line 16, delete "and," and insert -- and --, therefor.

Signed and Sealed this
Fifth Day of June, 2012

David J. Kappos
*Director of the United States Patent and Trademark Office*